US009891478B2

(12) United States Patent
Wu (10) Patent No.: US 9,891,478 B2
(45) Date of Patent: Feb. 13, 2018

(54) ARRAY SUBSTRATE AND LIQUID CRYSTAL DISPLAY

(71) Applicant: Shenzhen China Star Optoelectronics Technology Co., Ltd., Shenzhen, Guangdong (CN)

(72) Inventor: Yu-chih Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 287 days.

(21) Appl. No.: 14/438,224

(22) PCT Filed: Jan. 28, 2015

(86) PCT No.: PCT/CN2015/071704
§ 371 (c)(1),
(2) Date: Apr. 23, 2015

(87) PCT Pub. No.: WO2016/112563
PCT Pub. Date: Jul. 21, 2016

(65) Prior Publication Data
US 2017/0139282 A1    May 18, 2017

(30) Foreign Application Priority Data

Jan. 13, 2015  (CN) .......................... 2015 1 0016801

(51) Int. Cl.
*G02F 1/1343* (2006.01)
*G02F 1/137* (2006.01)
(Continued)

(52) U.S. Cl.
CPC ........ *G02F 1/134309* (2013.01); *G02F 1/137* (2013.01); *G02F 1/13439* (2013.01);
(Continued)

(58) Field of Classification Search
CPC ... G02F 1/134309; G02F 2001/134372; G02F 1/133345; G02F 1/13439; G02F 1/136286;
(Continued)

(56) References Cited

U.S. PATENT DOCUMENTS

9,310,653 B2 *  4/2016  Cheng ............... G02F 1/133707
2009/0002588 A1  1/2009  Lee et al.
(Continued)

*Primary Examiner* — Nathanael R Briggs
(74) *Attorney, Agent, or Firm* — Andrew C. Cheng (57) ABSTRACT

The present invention discloses an array substrate and liquid crystal display, and the array substrate comprises: a first substrate, which is transparent and a first electrode, located on the first substrate and employed to form a liquid crystal layer electrical field; wherein the first electrode comprises at least two non-parallel electrodes, a first strip electrode and a second strip electrode, and one end of the first strip electrode adjacent to the second strip electrode is bent/bent and extended to a tilt direction of the first strip electrode, and the one end of the first strip electrode adjacent to the second strip electrode is disconnected with the second strip electrode. With the aforesaid arrangement, the present invention can rapidly recover the liquid crystal molecules to the normal twisted directions as the liquid crystal display is acted upon by an external force, and is propitious to raise the image quality.

12 Claims, 5 Drawing Sheets

(51) Int. Cl.
*G02F 1/1362* (2006.01)
*G02F 1/1333* (2006.01)
*G02F 1/1337* (2006.01)

(52) U.S. Cl.
CPC .. *G02F 1/133345* (2013.01); *G02F 1/133707* (2013.01); *G02F 1/136286* (2013.01); *G02F 2001/134372* (2013.01); *G02F 2201/121* (2013.01); *G02F 2201/123* (2013.01)

(58) Field of Classification Search
CPC .............. G02F 1/137; G02F 2201/121; G02F 2201/123; G02F 1/133707
See application file for complete search history.

(56) References Cited

U.S. PATENT DOCUMENTS

| | | |
|---|---|---|
| 2009/0046233 A1 | 2/2009 | Cho et al. |
| 2009/0225267 A1 | 9/2009 | Atarshiya et al. |
| 2009/0296037 A1 | 12/2009 | Tanaka et al. |
| 2012/0169983 A1* | 7/2012 | Ko .................. G02F 1/134363 349/139 |
| 2012/0249914 A1* | 10/2012 | Jung .................. H01L 27/124 349/43 |
| 2014/0192308 A1 | 7/2014 | Furukawa et al. |
| 2014/0267994 A1 | 9/2014 | Ryu et al. |
| 2015/0116644 A1 | 4/2015 | Morishita et al. |

* cited by examiner

ARRAY SUBSTRATE AND LIQUID CRYSTAL DISPLAY

FIELD OF THE INVENTION

The present invention relates to a display panel technology field, and more particularly to an array substrate and liquid crystal display.

BACKGROUND OF THE INVENTION

The liquid crystal display possesses advantages of thin body, power saving, low radiation and soft image of not hurting eyes, and is the main stream display in the present display market. According to the different alignment directions of the liquid crystal molecules, the liquid crystal displays can be categorized as IPS display, VA display and FFS display (Fringe Field Switching). Compared with other displays, the FFS display has better wide view angle effect, which is the wide view angle technology developed by the liquid crystal industry for solving large scale, high resolution desktop display and liquid crystal TV applications.

Figure 1:
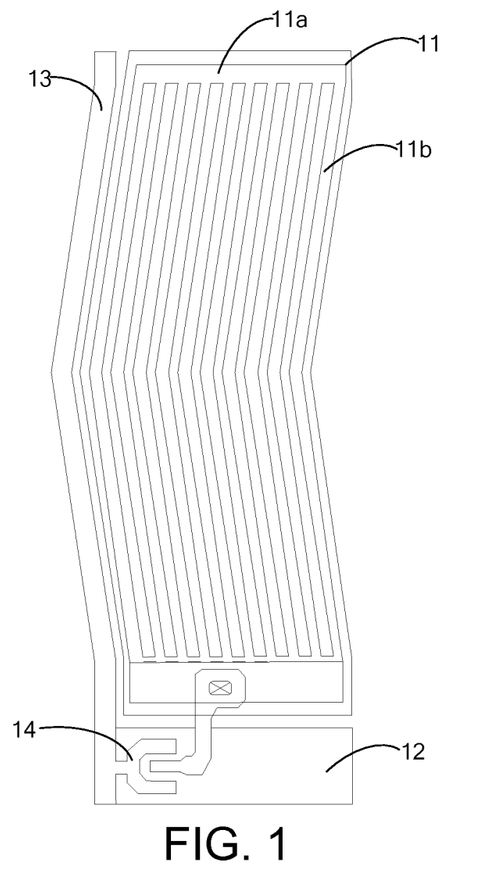
FIG. 1 is a structural diagram of a pixel electrode according to a liquid crystal display of prior art.
Figure 2:
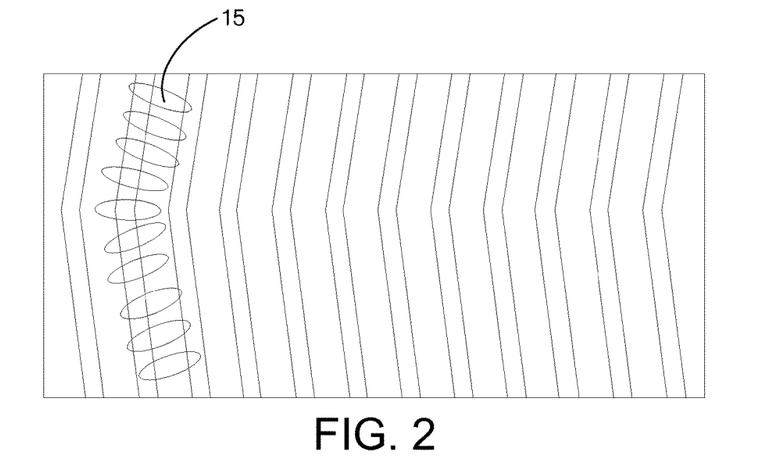
FIG. 2 is a diagram showing the alignment directions of the liquid crystal molecules acted upon by the pixel electrode shown in FIG. 1.

The FFS liquid crystal display technology is mainly to generate a fringe electrical field with electrodes inside a pixel in a plane. Utilizing the fringe electrical field, the oriented liquid crystal molecules between the electrodes and right above the electrodes can be rotated, converted along the direction parallel with the substrate plane. Thus, the transmittance of the liquid crystal layer can be promoted. Under the premise of wide view angle, the high transmitting efficiency can be realized in advance. As shown in FIG. 1, the pixel structure of the FFS liquid crystal display according to prior art comprises a pixel electrode 11, a gate line 12 applying scan signals, a data line 13 applying data signals and a transistor switch 14. As shown in FIG. 1, the pixel electrode comprises a terminal electrode branch 11a and a plurality of sub electrodes 11b. The terminal electrode branch 11a is connected to the plurality of sub electrodes 11b. Crack structures exist among the plurality of sub electrodes 11b, which are employed as the flow openings of electrical field. Besides the sub electrode 11b comprises top and bottom two parts connecting with each other. The top and bottom two parts have V shape structures. Thus, as the voltage is applied to the pixel electrode, as shown in FIG. 2, the liquid crystal molecules 15 can be aligned along two different directions, and accordingly, the better wide view angle effect can be obtained.

Figure 3:
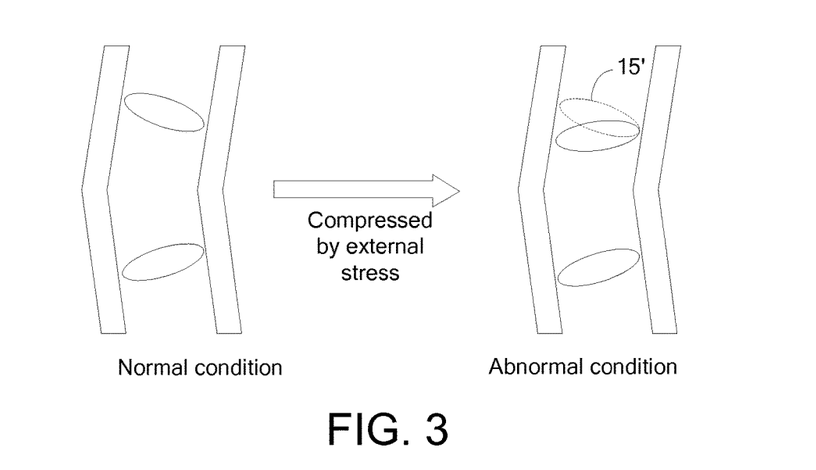
FIG. 3 is a diagram showing the alignment directions of the liquid crystal molecules acted upon by an external force in the liquid crystal display shown in FIG. 1.

When the liquid crystal display is compressed by a larger external stress, the alignment directions of the liquid crystal molecules 15 can be changed easily. Particularly, the liquid crystal molecules at the juncture of the top and bottom two parts of the sub electrode 11b where the electrical field is weaker can be influenced by the external force more easily. As shown in FIG. 3, as being compressed by the external stress, the alignment direction of the liquid crystal molecules 15' corresponding to the top electrode part is changed from the upward twist in normal condition to the downward twist. However, because the top and bottom two parts of the sub electrode 11b connect with each other, the fringe electrical field generated at the juncture of the two parts of electrode is weaker, which causes that the liquid crystal molecules are hard to be controlled to be rapidly recovered to the normal twisted directions as the external force disappears. It results in the poor recovery of the liquid crystal molecules and the image quality is influenced.

SUMMARY OF THE INVENTION

A technical issue that the present invention is mainly to solve is to provide an array substrate, which can rapidly recover the liquid crystal molecules to the normal twisted directions as the liquid crystal display is acted upon by an external force, and is propitious to raise the image quality.

For solving the aforesaid objective, the technical solution employed by the present invention is: providing an array substrate, comprising: a first substrate, which is transparent and a first electrode, located on the first substrate and employed to form a liquid crystal layer electrical field; wherein the first electrode comprises at least two non-parallel electrodes, a first strip electrode and a second strip electrode, and one end of the first strip electrode adjacent to the second strip electrode is bent/bent and extended to a tilt direction of the first strip electrode, and the one end of the first strip electrode adjacent to the second strip electrode is disconnected with the second strip electrode; structures of the first strip electrode and the second strip electrode are the same to make the first strip electrode and the second strip electrode are mirror symmetrically located; the first electrode is a common electrode of a FFS liquid crystal display, and the array substrate further comprises a second electrode located on the first substrate, and the second electrode is a pixel electrode of the FFS liquid crystal display, and the pixel electrode is a whole sheet transparent electrode, and an insulative layer is located between the common electrode and the pixel electrode.

The common electrode is located above the pixel electrode.

A perpendicular line, perpendicular with a midline between the first strip electrode and the second strip electrode is defined as a reference line, and an included angle between a non-bent/bent and extended electrode part of the first strip electrode and the reference line is smaller than 15 degrees, and an included angle between a bent/bent and extended electrode part of the first strip electrode and the reference line is larger than or equal to 15 degrees.

For solving the aforesaid objective, the another technical solution employed by the present invention is: providing an array substrate, comprising a first substrate, which is transparent and a first electrode, located on the first substrate and employed to form a liquid crystal layer electrical field; wherein the first electrode comprises at least two non-parallel electrodes, a first strip electrode and a second strip electrode, and one end of the first strip electrode adjacent to the second strip electrode is bent/bent and extended to a tilt direction of the first strip electrode, and the one end of the first strip electrode adjacent to the second strip electrode is disconnected with the second strip electrode.

Structures of the first strip electrode and the second strip electrode are the same to make the first strip electrode and the second strip electrode are mirror symmetrically located.

The first strip electrode is a common electrode of a FFS liquid crystal display, and the array substrate further comprises a second electrode located on the first substrate, and the second electrode is a pixel electrode of the FFS liquid crystal display, and the pixel electrode is a whole sheet transparent electrode, and an insulative layer is located between the common electrode and the pixel electrode.

The common electrode is located above the pixel electrode.

A perpendicular line, perpendicular with a midline between the first strip electrode and the second strip electrode is defined as a reference line, and an included angle between a non-bent/bent and extended electrode part of the first strip electrode and the reference line is smaller than 15 degrees, and an included angle between a bent/bent and extended electrode part of the first strip electrode and the reference line is larger than or equal to 15 degrees.

For solving the aforesaid objective, the another technical solution employed by the present invention is: providing a liquid crystal display, comprising a first substrate, a second substrate and a liquid crystal layer between the first substrate and the second substrate; and further comprising a first electrode, located on the first substrate and the first electrode is employed to form a liquid crystal layer electrical field; wherein the first electrode comprises at least two non-parallel electrodes, a first strip electrode and a second strip electrode, and one end of the first strip electrode adjacent to the second strip electrode is bent/bent and extended to a tilt direction of the first strip electrode, and the one end of the first strip electrode adjacent to the second strip electrode is disconnected with the second strip electrode.

Structures of the first strip electrode and the second strip electrode are the same to make the first strip electrode and the second strip electrode are mirror symmetrically located.

The liquid crystal display is a FFS liquid crystal display, and the first electrode is a common electrode and the liquid crystal display further comprises a second electrode located on the first substrate, and the second electrode is a pixel electrode, and the pixel electrode is a whole sheet transparent electrode, and an insulative layer is located between the common electrode and the pixel electrode, and the common electrode is located above the pixel electrode.

wherein a perpendicular line, perpendicular with a midline between the first strip electrode and the second strip electrode is defined as a reference line, and an included angle between a non-bent/bent and extended electrode part of the first strip electrode and the reference line is smaller than 15 degrees, and an included angle between a bent/bent and extended electrode part of the first strip electrode and the reference line is larger than or equal to 15 degrees.

The benefits of the present invention are: different from the condition of prior arts, the first electrode of the present invention comprises non-parallel electrodes, the first strip electrode and the second strip electrode, and with the one end of the first strip electrode adjacent to the second strip electrode disconnected with the second strip electrode, the more fringe electrical field force can be formed between the first strip electrode and the second strip electrode to enhance the control capability to the liquid crystal molecules. Thereby, the liquid crystal molecules near the juncture of the first strip electrode and the second strip electrode can be rapidly recovered to the alignment state before the external force is acted after the external force acting upon the liquid crystal display disappears to improve the issue of poor recovery of the liquid crystal molecules and is propitious to raise the display quality.

DETAILED DESCRIPTION OF PREFERRED EMBODIMENTS

The present invention will be further described in detail with the accompanying drawings and the specific embodiments.

Figure 4:
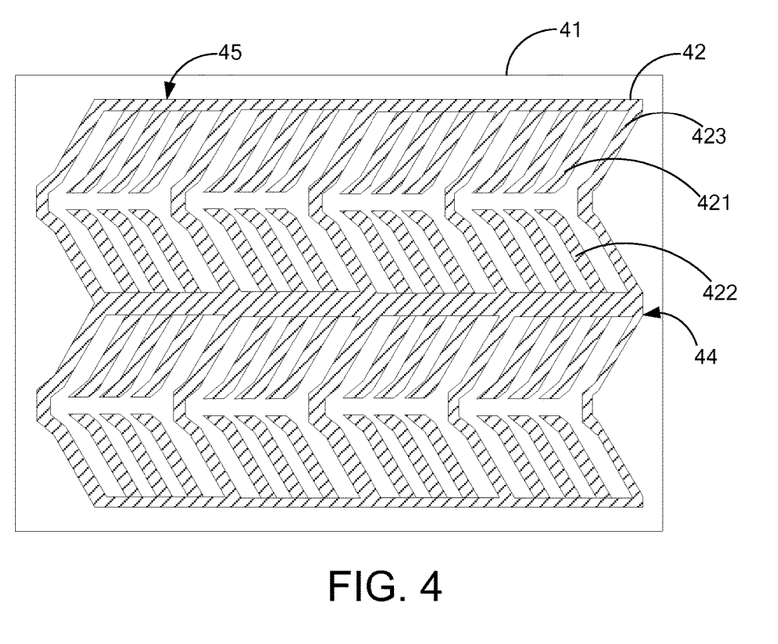
FIG. 4 is a structural diagram of an array substrate according to one embodiment of the present invention.
Figure 5:
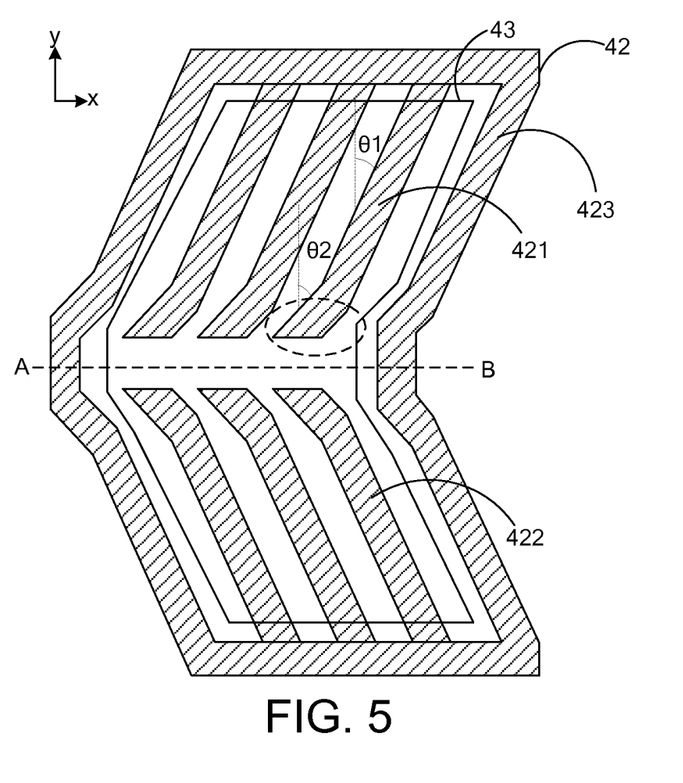
FIG. 5 is an enlarged structural diagram of a first electrode of the array substrate shown in FIG. 4.

Please refer to FIG. 4 and FIG. 5. In the array substrate according to the one embodiment of the present invention, the array substrate comprises a first substrate 41, which is transparent and a plurality of first electrodes 42, located on the first substrate 41 and employed to form a liquid crystal layer electrical field, and the first electrodes 42 are the shadow part as indicated in the figure. One first electrode 42 defines one pixel electrode.

In this embodiment, the first electrode 42 is a common electrode of a FFS liquid crystal display.

The first electrode 42 comprises a plurality of first strip electrodes 421 and a plurality of second strip electrodes 422, and the first strip electrodes 421 and the second strip electrodes 422 are not parallel. On the basis of diagram shown in FIG. 5, the tilt directions of the first strip electrodes 421 and the second strip electrodes 422 are different, and the first strip electrodes 421 tilt toward right and up, and the second strip electrodes 422 tilt toward right and down. Moreover, as shown in the dot circle in FIG. 5, one end of the first strip electrode 421 adjacent to the second strip electrode 422 is bent/bent and extended to a tilt direction of the first strip electrode 421. That is, the one end of the first strip electrode 421 adjacent to the second strip electrode 422 is bent/bent and extended toward right and up. The one end of the first strip electrode 421 adjacent to the second strip electrode 422 is disconnected with the second strip electrode 422, i.e. the first strip electrode 421 and the second strip electrode 422 are not connected.

Furthermore, the first strip electrode 421 in this embodiment further comprises a first electrode part and a second electrode part, and the second electrode part is more adjacent to the second strip electrode rather than the first electrode part, and disconnected with the second strip electrode 422. Besides, a perpendicular line, perpendicular with a midline AB between the first strip electrode 421 and the second strip electrode 422 is defined as a reference line, and as shown in FIG. 5, the midline AB between the first strip electrode 421 and the second strip electrode 422 is a horizontal line parallel with the x axis, and the reference line is a vertical line parallel with the y axis. An included angle θ2 between the second electrode part and the reference line is larger than an included angle θ1 between the first electrode part and the reference line. That is to say, the second electrode part is the one end of the first strip electrode 421 adjacent to the second strip electrode, and corresponds to the bent/bent and extended electrode part of the first strip electrode 421, and the first electrode part is the non-bent/bent and extended electrode part of the first strip electrode 421.

Besides, the first electrode 42 further comprises a connection electrode 423, and the connection electrode 423 is located at periphery of the first strip electrode 421 and the second strip electrode 422, and both the first strip electrode 421 and the second strip electrode 422 are connected to the connection electrode 423, and common voltage signal is inputted to the first strip electrode 421 and the second strip electrode 422 via the connection electrode 423.

Moreover, as shown in FIG. 4, all the first electrode 42 are connected to the connection electrode 423, and the voltage inputted to all the first electrode 42 is the common electrode employed to form the liquid crystal layer electrical field.

In this embodiment, at the parting of the first strip electrode 421 and the second strip electrode 422, by disconnecting the first strip electrode 421 and the second strip electrode 422, a certain gap exists between the first strip electrode 421 and the second strip electrode 422. Thus, the common electrode and the pixel electrode do not overlap between the first strip electrode 421 and the second strip electrode 422 to provide the formation condition for the fringe electrical field. Thus, as the voltage is applied to the first electrode 42 to drive the liquid crystal display, more fringe electrical field can be generated between the first strip electrode 421 and the second strip electrode 422, and thus, to enhance the control capability to the liquid crystal molecules. When the liquid crystal molecules are acted upon by an external stress and abnormally twisted, the liquid crystal molecules can be controlled to be rapidly recovered to the twisted state before being compressed by the external stress after the external stress acting upon the liquid crystal display disappears. Meanwhile, the influence of the external stress to the liquid crystal molecules can be reduced.

Furthermore, for more rapidly recovering the liquid crystal molecules back to the original twisted state, in the embodiment of the array substrate according to the present invention, the included angle θ1 between the non-bent/bent and extended electrode part of the first strip electrode 421 and the reference line is smaller than 15 degrees. For instance, θ1 can be in a range of 5-10° or 11-14°, and specifically can be 3°, 7° or 9° depending on actual application conditions. The included angle θ2 between the bent/bent and extended electrode part of the first strip electrode 421 and the reference line is larger than or equal to 15 degrees, i.e. θ2 is larger than θ1, and the bent/bent and extended electrode part of the first strip electrode 421 is the one end of the first strip electrode 421 adjacent to the second strip electrode 422. θ2 can be in a range of 20-30° or 35-50°, and specifically can be 25° or 45°.

By making the included angle θ2 between the bent/bent and extended electrode part and the vertical direction larger than the included angle θ1 between the non-bent/bent and extended electrode part and the vertical direction, the fringe electrical field force at the juncture between the first strip electrode 421 and the second strip electrode 422 can be enhanced in advance. Thereby, the control capability to the liquid crystal molecules can be further enhanced and the liquid crystal molecules can be rapidly recovered to the twisted state before being compressed by the external force after the external force disappears.

Please continue to refer to FIG. 5. In the embodiment of the array substrate according to the present invention, the array substrate further comprises a plurality of second electrodes 43 located on the first substrate 41, and the second electrodes 43 are pixel electrodes of a FFS liquid crystal display. The second electrode 43 is a whole sheet transparent electrode, and the whole sheet means against to the pixel electrode. That is, the pixel electrode is a whole sheet transparent electrode.

In a traditional FFS liquid crystal display, the pixel electrode is generally a strip electrode, and the common electrode is designed to be a sheet electrode to utilize the cracks in the pixel electrode to generate fringe electrical field. However, in such design, the pixel electrode is a strip electrode, and the strength is worse and easily broken. Once the one of the pixel electrodes is broken, the display unit where the pixel is may not be able to display normally, of which the defective pixel can easily occur. In this embodiment, by designing the common electrode to be a strip electrode, and the pixel electrode to be a sheet transparent electrode, and utilizing the cracks between the strip common electrodes to generate fringe electrical field and to realize the display of the FFS liquid crystal display. Compared with the traditional technology of designing the pixel electrode to be a strip electrode, the whole sheet pixel electrode structure can promote the reliability of the pixel electrode. Meanwhile, all the common electrodes are connected together. Even one strip electrode of one common electrode is broken, the common voltage still can be applied to the broken strip electrode, and the influence to driving the liquid crystal is smaller.

Besides, in this embodiment, the first electrode 42 as being the common electrode is above the second electrode 43 as being the pixel electrode, i.e. the first electrode 42 is at an upper layer of the second electrode 43, and an insulative layer is spacing the first electrode 42 and the second electrode 43. Certainly, the first electrode 42 can be under the second electrode 43.

Structures of the first strip electrode 421 and the second strip electrode 422 are the same and the first strip electrode 421 and the second strip electrode 422 are mirror symmetrically located.

Please refer to FIG. 4 again. The array substrate further comprises a scan line 44 employed for inputting a scan signal and a data line 45 employed for inputting a data signal. The first electrode 42 is distributed in mesh, and covers the scan line 44 and the data line 45.

The array substrate of the present invention is similarly applied for other liquid crystal displays, such as IPS liquid crystal display. The first electrode and the second electrode can respectively be the common electrode and the pixel electrode of the IPS liquid crystal display. Then, the first electrode and the second electrode are located on two different substrates.

Figure 6:
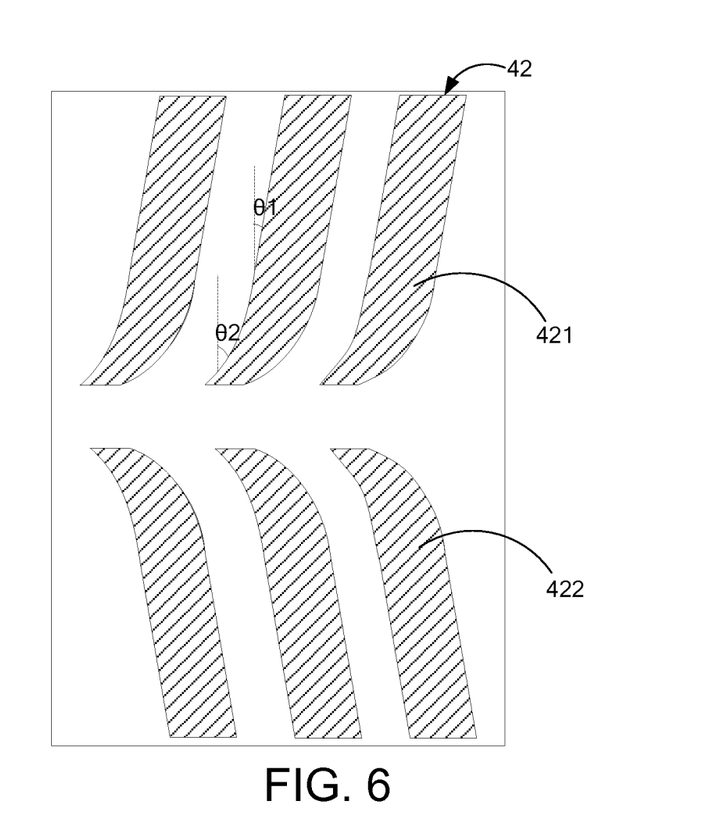
FIG. 6 is an enlarged structural diagram of a first electrode of the array substrate according to another embodiment of the present invention, wherein a structure merely indicates the first strip electrode and the second strip electrode is shown in the figure.

Besides, in other embodiments, the first electrode 42 can be the pixel electrode of the liquid crystal display, and then the second electrode 43 is the common electrode of the liquid crystal display. Furthermore, the appearance of the one end of the first strip electrode 421 adjacent to the second strip electrode 422, i.e. the bent/bent and extended electrode part can be an arc shape as shown in FIG. 6 FIG. 6 merely shows structures of the first strip electrode 421 and the second strip electrode 422.

Figure 7:
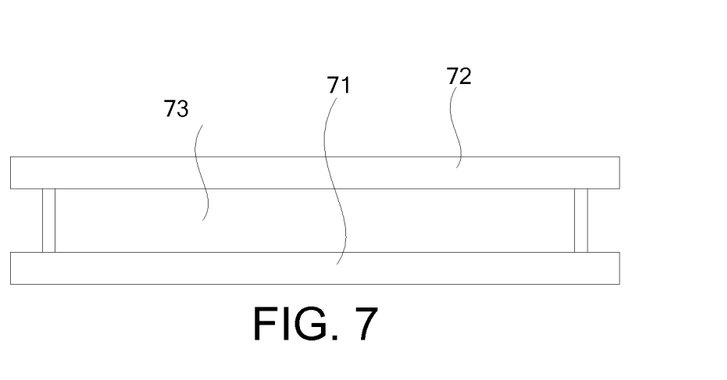
FIG. 7 is a structural diagram of a liquid crystal display according to one embodiment of the present invention.

Please refer to FIG. 7. In one embodiment of the liquid crystal display according to the present invention, the liquid crystal display comprises a first substrate 71, a second substrate 72 and a liquid crystal layer 73 between the first substrate 71 and the second substrate 72. The first substrate 71 is employed to form an array substrate of the liquid crystal display, and the second substrate 72 is employed to form a color filter substrate of the liquid crystal display.

In this embodiment, the liquid crystal display is a FFS liquid crystal display, and the first electrode and the second electrode as aforementioned in the above embodiments are located on the first substrate 71.

Certainly, in other implements, the liquid crystal display can be other liquid crystal displays. Then, the first electrode as being the common electrode and the second electrode as being the pixel electrode can be located on different substrates.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An array substrate, comprising:
   a first substrate, which is transparent and a first electrode, located on the first substrate and employed to form a liquid crystal layer electrical field;
   wherein the first electrode comprises at least two non-parallel electrodes, a plurality of first strip electrodes which are parallel with one another and a plurality of second strip electrodes which are parallel with one another, and one end of the first strip electrode adjacent to the second strip electrode is bent to a tilt direction of the first strip electrode, and the one end of the first strip electrode adjacent to the second strip electrode is disconnected with the second strip electrode with having an imaginary line at a half distance between any two adjacent edges of the plurality of first strip electrodes and the plurality of second strip electrodes;
   structures of the first strip electrode and the second strip electrode are the same to make the first strip electrode and the second strip electrode are mirror symmetrically located;
   the first electrode is a common electrode of a FFS liquid crystal display, and the array substrate further comprises a second electrode located on the first substrate, and the second electrode is a pixel electrode of the FFS liquid crystal display, and the pixel electrode is a whole sheet transparent electrode, and an insulative layer is located between the common electrode and the pixel electrode.

2. The array substrate according to claim 1, wherein the common electrode is located above the pixel electrode.

3. The array substrate according to claim 1, wherein a perpendicular line, perpendicular with the imaginary line at the half distance between any two adjacent edges of the first strip electrodes and the second strip electrodes is defined as a reference line, and an included angle between a main body part of the first strip electrode and the reference line is smaller than 15 degrees, and an included angle between a bent part of the first strip electrode and the reference line is larger than or equal to 15 degrees.

4. An array substrate, comprising:
   a first substrate, which is transparent and a first electrode, located on the first substrate and employed to form a liquid crystal layer electrical field;
   wherein the first electrode comprises at least two non-parallel electrodes, a plurality of first strip electrodes which are parallel with one another and a plurality of second strip electrodes which are parallel with one another, and one end of the first strip electrode adjacent to the second strip electrode is bent to a tilt direction of the first strip electrode, and the one end of the first strip electrode adjacent to the second strip electrode is disconnected with the second strip electrode with having an imaginary line at a half distance between any two adjacent edges of the plurality of first strip electrodes and the plurality of second strip electrodes.

5. The array substrate according to claim 4, wherein structures of the first strip electrode and the second strip electrode are the same to make the first strip electrode and the second strip electrode are mirror symmetrically located.

6. The array substrate according to claim 4, wherein the first electrode is a common electrode of a FFS liquid crystal display, and the array substrate further comprises a second electrode located on the first substrate, and the second electrode is a pixel electrode of the FFS liquid crystal display, and the pixel electrode is a whole sheet transparent electrode, and an insulative layer is located between the common electrode and the pixel electrode.

7. The array substrate according to claim 6, wherein the common electrode is located above the pixel electrode.

8. The array substrate according to claim 4, wherein a perpendicular line, perpendicular with the imaginary line at the half distance between any two adjacent edges of the first strip electrode and the second strip electrode is defined as a reference line, and an included angle between a main body part of the first strip electrode and the reference line is smaller than 15 degrees, and an included angle between a bent part of the first strip electrode and the reference line is larger than or equal to 15 degrees.

9. A liquid crystal display,
   comprising a first substrate, a second substrate and a liquid crystal layer between the first substrate and the second substrate;
   and further comprising a first electrode, located on the first substrate and the first electrode is employed to form a liquid crystal layer electrical field;
   wherein the first electrode comprises at least two non-parallel electrodes, a plurality of first strip electrodes which are parallel with one another and a plurality of second strip electrodes which are parallel with one another, and one end of the first strip electrode adjacent to the second strip electrode is bent to a tilt direction of the first strip electrode, and the one end of the first strip electrode adjacent to the second strip electrode is disconnected with the second strip electrode with having an imaginary line at a half distance between any two adjacent edges of the plurality of first strip electrodes and the plurality of second strip electrodes.

10. The liquid crystal display according to claim 9, wherein structures of the first strip electrode and the second strip electrode are the same to make the first strip electrode and the second strip electrode are mirror symmetrically located.

11. The liquid crystal display according to claim 9, wherein the liquid crystal display is a FFS liquid crystal display, and the first electrode is a common electrode and the liquid crystal display further comprises a second electrode located on the first substrate, and the second electrode is a pixel electrode, and the pixel electrode is a whole sheet transparent electrode, and an insulative layer is located between the common electrode and the pixel electrode, and the common electrode is located above the pixel electrode.

12. The liquid crystal display according to claim 9, wherein a perpendicular line, perpendicular with a midline between the first strip electrode and the second strip electrode is defined as a reference line, and an included angle between a main body part of the first strip electrode and the reference line is smaller than 15 degrees, and an included angle between a bent part of the first strip electrode and the reference line is larger than or equal to 15 degrees.

* * * * *